Figure 1:
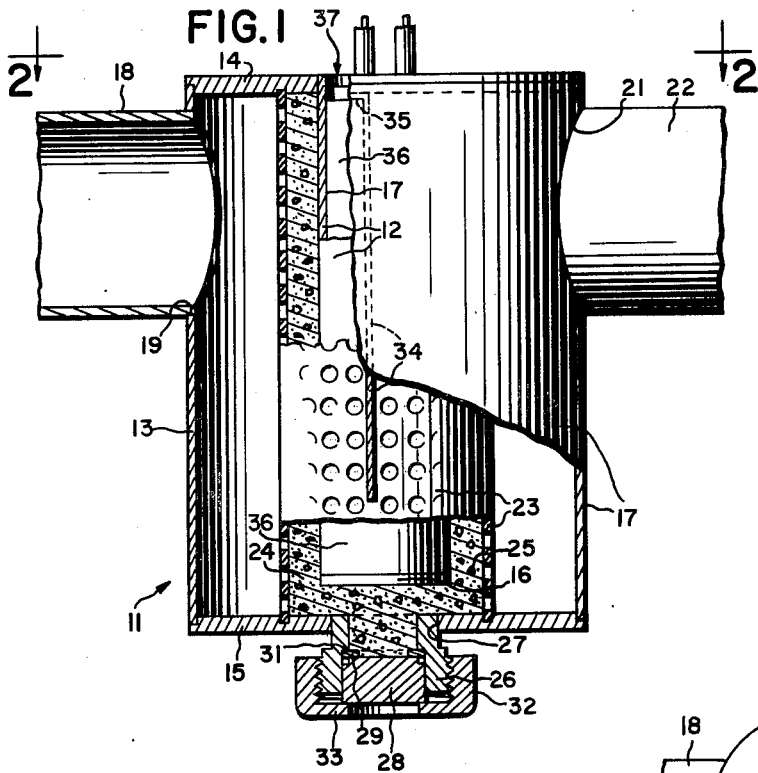

Aug. 17, 1965 W. R. WHEELER 3,200,569

SORPTION GAS AND VAPOR TRAP APPARATUS

Filed Jan. 31, 1962

INVENTOR.
WILLIAM R. WHEELER

BY *Wm J Nolan*

ATTORNEY

United States Patent Office 3,200,569
Patented Aug. 17, 1965

3,200,569
SORPTION GAS AND VAPOR TRAP APPARATUS
William R. Wheeler, Saratoga, Calif., assignor to Varian Associates, Palo Alto, Calif., a corporation of California
Filed Jan. 31, 1962, Ser. No. 170,001
3 Claims. (Cl. 55—208)

This invention relates to gas and vapor traps for vapor systems, and in particular relates to such traps in which the vapors and gases are sorbed by a sorbent material, such as, for example, activated charcoal or molecular sieve.

In accordance with prior art sorption traps a container, having inlet and outlet apertures and filled with a gas sorbent material was connected in the gas paths between different portions of a high vacuum system. The sorbent material would then sorb vapors, such as, for example, water vapor, mercury vapor, or oil vapor to prevent their fusion from one portion of the high vacuum system to another. After sorbing a certain quantity of gas, the sorbent material would become saturated and its effectiveness reduced. At this time the sorption trap could be rejuvenated by heating the sorbent material to produce outgassing thereof.

However, these prior art sorption traps have exhibited serious disadvantages. One disadvantage was the relatively poor conductance offered by those sorption traps which are entirely filled with a sorbent material. Another disadvantage was the required use of rather awkward and cumbersome heating elements to provide high temperature out-gassing of the sorbent material and the relatively large periods of time necessary for the sorbent material to reach the high temperatures required. Still another disadvantage experienced with prior art sorption traps was the contamination of the sorbent material by various residues after extended use of the trap. Such contamination would greatly reduce the efficiency and usefulness of the sorption trap and is not always eliminated by heating of the sorbent material.

The object of this invention, therefore, is to provide an improved, high conductance sorption gas and vapor trap which can be simply and quickly heated for rejuvenation and in which the sorbent material can be easily replaced after contamination.

One feature of the present invention is the provision of a sorption gas and vapor trap having an exterior compartment which is adapted to receive a heater element.

Another feature of the present invention is the provision of a sorption gas and vapor trap of the above featured type which is only partially filled with a sorbent material and wherein the portion of the trap containing the sorbent material is adjacent to the heater element exterior compartment.

Still another feature of this invention is the provision of a sorption gas and vapor trap whose inner chamber is readily accessible thereby allowing the trap to be easily emptied or filled with a gas and vapor sorbent material.

Figure 3:
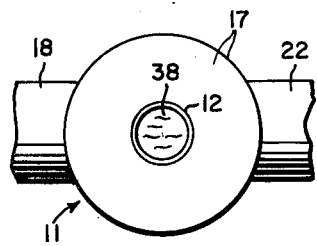
Figure 2:
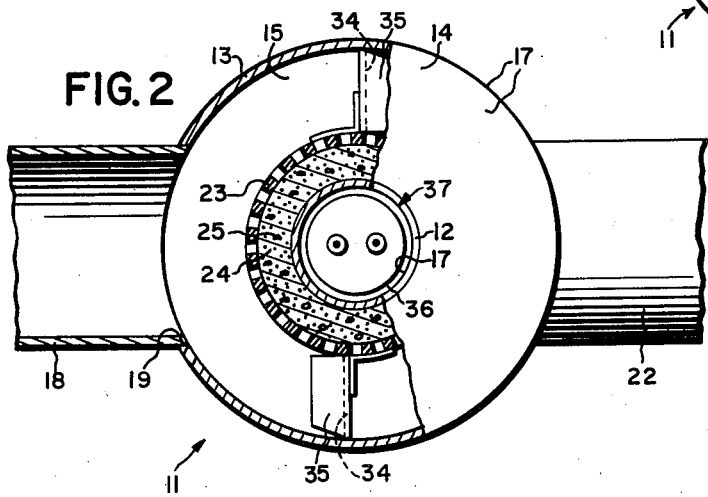

These and other features and advantages of the present invention will be more apparent after a perusal of the following specification taken in connection with the accompanying drawings wherein, FIG. 1 is a drawing of the sorption gas and vapor trap which comprises the present invention, FIG. 2 is a cross section of FIG. 1 taken on line 2—2, and, FIG. 3 is a reduced top view of FIG. 1, but with the heater means replaced by a cooling liquid.

Referring now to FIGS. 1 and 2, there is shown a container 11 formed by a hollow inner cylinder 12 centrally disposed within a large concentric hollow outer cylinder 13. An annular top closure plate 14 having an outer circumference equal to that of the outer cylinder 13 and an inner circumference equal to that of inner cylinder 12 is vacuum sealed to the upper ends of the cylinders. An apertured lower closure plate 15 and a circular closure plate 16 are vacuum sealed to the other ends of outer cylinder 13 and inner cylinder 12, respectively. Thus, the container 11 has an exterior wall 17 formed by the outer surface of outer cylinder 13, the inner surface of inner cylinder 12 and the outer surfaces of the three closure plates 14, 15, and 16.

A gas inlet tube 18 is vacuum sealed to an inlet aperture 19 in the upper region of the outer cylinder 13. Symmetrically disposed opposite the inlet aperture 19 is an outlet aperture 21 and associated outlet tube 22.

A cylindrical screen 23 of slightly larger diameter than inner cylinder 12 is centrally positioned within the container 11 between the apertured lower closure plate 15 and the annular top closure plate 14. The inner surface of the cylindrical screen 23 and the outer surface of the inner cylinder 12 form a sorption region 24 of annular shape which is filled with a gas and vapor sorbent material 25, such as, for example, molecular sieve or activated charcoal.

Vacuum sealed to the apertured lower closure plate 15 is an exteriorly threaded hollow tube 26 which together with lower closure plate central aperture 27 provides an opening into the sorption region 24 within the container 11. This opening may be used to either fill or empty the sorption region 24 of a sorbent material. The opening is vacuum sealed by a circular plug 28 which forces a gasket 29 against an interior shoulder 31 on the hollow tube 26. Sealing pressure is obtained by turning a nut 32 having an end portion 33 which slightly overlaps the circular plug 28.

Baffle plates 34 are disposed within the container 11 in a plane which is perpendicular to the central axes of inlet and outlet tubes 18 and 22. The baffle plates are attached to annular top closure plate 14 by tabs 35 and extend between outer cylinder 13 and cylindrical screen 23 for about three quarters of their length. The baffle plates 34 extend the length of the gas passageway formed by the cylindrical screen 23 by forcing gases which enter the inlet aperture 19 to flow to the bottom of container 11, under the baffle plate 34 and back to the top of container 11 before leaving through outlet aperture 21. In this way the number of collisions which a gas molecule makes with the sorbent material 25 and correspondingly the chance of individual gas molecule sorption are greatly increased.

An electrical heater 36 for heating the sorbent material 25 is removably positioned within the compartment 37 formed by the interior wall of inner cylinder 12. The electrical heater 36 is cylindrical with an outer diameter substantially the same as the inner diameter of the hollow inner cylinder 12. This construction permits simple replacement of a defective heater or allows the use of a single heater for a plurality of sorption traps. The compartment 37, as best seen in FIG. 3, can also be advantageously used in some applications as a reservoir for a cooling liquid 38, such as liquid nitrogen which improves the efficiency of trap by cooling the sorbent material 25.

In operation of this invention the container 11 is placed in the pumping line of a vacuum system with, for example, the outlet tube 22 connected to a vacuum pump and the inlet tube 18 connected to a chamber to be evacuated. Gases circulating in the pumping line will then freely pass through the open gas passageway in the container 11 while certain impurities in the gas will be sorbed by the sorbent material 25. For example, mercury or oil vapors generated in the vacuum pump and diffusing through the pumping line will be sorbed in the container 11 to prevent them from reaching and contaminating the chamber being evacuated. Also, water vapor generated by the vacuum chamber is prevented from diffusing to the vacuum pump which normally has a very poor water vapor pumping speed.

However, after a certain amount of gas has been sorbed the sorbent material 25 will become relatively ineffective. The container 11 can then be valved off from the vacuum chamber and the electrical heater energized to produce heating and a resultant outgassing of the sorbent material. This outgassing will restore the gas sorption ability of the sorbent material 25. The novel construction of the present trap permits extremely convenient use of a heating element for outgassing. The electrical heater 36 can be easily used in even crowded conditions since it requires no additional space or support. Also, the placement of the electrical heater 37 adjacent to the sorption region 24 and in close proximity to all of the sorbent material 25 provides for extremely rapid heating and outgassing of the sorbent material. For example, a typical embodiment of this invention having a 4.4 inches long outer cylinder of 3 inches diameter, a 4 inches long inner cylinder 12 of 1 inch diameter and a screen cylinder 23 of 1.6 inches diameter and filled with synthetic zeolite molecular sieve was completely outgassed by a 60 watt heater in about 30 minutes.

After extended use in certain applications the sorbent material can become contaminated with various residues which seriously reduce the material's effectiveness and which cannot be removed by heating. In these cases the plug 28 can be easily removed and the contaminated sorbent material replaced.

Thus, the present invention provides a vapor trap which offers excellent gas trapping qualities, high conductance, ease of operation and extremely long life.

Since many changes could be made in the above construction and many apparently widely different embodiments of this invention could be made without departing from the scope thereof it is intended that all matter contained in the above description or shown in the accompanying drawings shall be interpreted as illustrative and not in a limiting sense.

What is claimed is:

1. A vacuum trap comprising: a cylindrical container made of impervious material having a top wall, a bottom wall and a side wall, said container having gas molecular inlet and outlet openings therein; a hollow, vertical, cylindrical, heat conductive member having a bottom wall spaced above the bottom wall of said container and a side wall extending into said container from the top wall of said container and spaced from the side wall of said container; an apertured cylindrical member obstructing the line of sight between said inlet and outlet openings vertically disposed within said container, spaced from said container side wall and surrounding said heat conductive member; sorbent material disposed between said heat conductive member and said apertured cylindrical member; baffle means extending between said apertured cylindrical member and said container interior side wall for increasing the probability of collision between said gas molecules and said sorbent material; and, heater means disposed within and spaced from said heat conductive member.

2. The trap according to claim 1 including an additional opening in said container, said additional opening providing access to said sorbent material disposed between said apertured cylindrical member and said heat conductive member, and removable means for vacuum sealing said additional opening.

3. A vacuum trap comprising: a cylindrical container made of impervious material having a top wall, a bottom wall and a side wall, said container having gas molecule inlet and outlet openings therein; a hollow, vertical, cylindrical, heat conductive member having a bottom wall spaced above the bottom wall of said container and a side wall extending into said container from the top wall of said container and spaced from the side wall of said container; an apertured cylindrical member obstructing the line of sight between said inlet and outlet openings vertically disposed within said container, spaced from said container side wall and surrounding said heat conductive member; sorbent material disposed between said heat conductive member and said apertured cylindrical member; baffle means extending between said apertured cylindrical member and said container interior side wall for increasing the probability of collision between said gas molecules and said sorbent material; and a body of cooling liquid disposed within said heat conductive member.

References Cited by the Examiner

UNITED STATES PATENTS

| | | | |
|---|---|---|---|
| 1,714,245 | 5/29 | Schaefer | 55—208 |
| 2,336,456 | 12/43 | Anderegg | 55—208 |
| 2,450,289 | 9/48 | Marek | 55—208 |
| 2,471,442 | 5/49 | Morf | 55—208 |
| 2,563,042 | 8/51 | Jaubert | 34—80 |
| 2,633,928 | 4/53 | Chamberlain | 34—80 X |
| 2,841,323 | 7/58 | Lindenblad | 230—69 |
| 2,975,860 | 3/61 | Westeren | 55—33 |
| 3,067,560 | 12/62 | Parker | 55—387 |
| 3,077,712 | 2/63 | Milleron et al. | 55—387 X |
| 3,116,764 | 1/64 | Jepson et al. | 230—69 |

OTHER REFERENCES

German Application 1,075,894, 2/60.

REUBEN FRIEDMAN, *Primary Examiner.*

GEORGE D. MITCHELL, *Examiner.*